(12) United States Patent
Burd et al.

(10) Patent No.: US 8,482,451 B2
(45) Date of Patent: Jul. 9, 2013

(54) RESONANT REFLECTOR ASSEMBLY AND METHOD

(75) Inventors: Harvey John Burd, Marston (GB); David John Edwards, Chipping Norton (GB); Christopher John Stevens, Oxford (GB); Tong Hao, Yancheng (CN)

(73) Assignee: Isis Innovation Limited, Oxford (GB)

( * ) Notice: Subject to any disclaimer, the term of this patent is extended or adjusted under 35 U.S.C. 154(b) by 303 days.

(21) Appl. No.: 12/867,673

(22) PCT Filed: Feb. 16, 2009

(86) PCT No.: PCT/GB2009/050147
§ 371 (c)(1),
(2), (4) Date: Aug. 13, 2010

(87) PCT Pub. No.: WO2009/101450
PCT Pub. Date: Aug. 20, 2009

(65) Prior Publication Data
US 2010/0328136 A1  Dec. 30, 2010

(30) Foreign Application Priority Data

Feb. 14, 2008  (GB) .................................. 0802729.4

(51) Int. Cl.
*H01Q 15/00* (2006.01)
*H01Q 19/10* (2006.01)
*H01Q 7/00* (2006.01)
*H01Q 21/00* (2006.01)
*G01S 13/00* (2006.01)

(52) U.S. Cl.
USPC ................. 342/5; 342/22; 342/175; 343/832; 343/866; 343/867

(58) Field of Classification Search
USPC ................ 342/5, 22, 175; 343/741, 748, 755, 343/756, 787, 788, 866
See application file for complete search history.

(56) References Cited

U.S. PATENT DOCUMENTS 2,688,083 A * 8/1954 Hills ............................... 343/791
3,769,623 A * 10/1973 Fletcher et al. ................ 343/909
(Continued)

FOREIGN PATENT DOCUMENTS

EP  0435585 A2  12/1990

OTHER PUBLICATIONS

Mulhausen, Dorothee; International Preliminary Report on Patentability (PCT/GB2009/050148); Aug. 17, 2010; 8 pgs; The International Bureau of WIPO; Geneva, Switzerland.

(Continued)

*Primary Examiner* — Jack W Keith
*Assistant Examiner* — Peter Bythrow
(74) *Attorney, Agent, or Firm* — Crain, Caton & James (57) ABSTRACT

A resonant radar reflector assembly comprising first and second reflector members (110A, 110B), the first and second and reflector members each being configured to resonate at their respective resonant frequency when irradiated by radio frequency (RF) radiation of a corresponding frequency, wherein the first member has a portion (114A) responsive to an electric field applied parallel to an electric polarization axis of the first member, the second member having a corresponding portion (114B) responsive to an electric field applied parallel to a corresponding electric polarization axis of the second member, the first member also having a portion (112A) responsive to a magnetic field applied parallel to a magnetic polarization axis of the first member, the second member having a corresponding portion (112B) responsive to a magnetic field applied parallel to a corresponding magnetic polarization axis of the second member, the first and second members being arranged such that at least one electric or magnetic polarization axis of the first member is substantially not parallel to the corresponding electric or magnetic polarization axis of the second member.

20 Claims, 8 Drawing Sheets

U.S. PATENT DOCUMENTS

| | | | |
|---|---|---|---|
| 3,789,404 A * | 1/1974 | Munk | 342/5 |
| 3,842,421 A * | 10/1974 | Rootsey et al. | 343/909 |
| 4,287,520 A * | 9/1981 | Van Vliet et al. | 343/909 |
| 5,572,226 A * | 11/1996 | Tuttle | 343/726 |
| 5,790,080 A * | 8/1998 | Apostolos | 343/744 |
| 5,837,926 A * | 11/1998 | Franklin | 102/427 |
| 5,942,991 A * | 8/1999 | Gaudreau et al. | 340/870.16 |
| 6,359,599 B2 * | 3/2002 | Apostolos | 343/895 |
| 6,538,617 B2 * | 3/2003 | Rochelle | 343/788 |
| 6,563,472 B2 * | 5/2003 | Durham et al. | 343/781 P |
| 7,071,889 B2 * | 7/2006 | McKinzie et al. | 343/756 |
| 7,421,245 B2 * | 9/2008 | Lieffort et al. | 455/41.1 |
| 2002/0109636 A1 * | 8/2002 | Johnson et al. | 343/742 |
| 2003/0085843 A1 * | 5/2003 | Thursby et al. | 343/744 |
| 2005/0040994 A1 * | 2/2005 | Mazoki et al. | 343/809 |
| 2005/0242959 A1 * | 11/2005 | Watanabe | 340/572.7 |
| 2006/0044769 A1 * | 3/2006 | Forster et al. | 361/760 |
| 2007/0057769 A1 * | 3/2007 | Corbett | 340/10.1 |

OTHER PUBLICATIONS

Ludwig, A., Tewes, M., Glasmachers, S., Lohndorf, M. & Quandt, E.; High-Frequency Magnetoelastic Materials for Remote-Interrogated Stress Sensors; Journal of Magnetism and Magnetic Materials; 2002; pp. 1126-1131; Elsevier Science B.V.

Mulhausen, Dorothee; International Preliminary Report on Patentability (PCT/GB2009/050147); Aug. 17, 2010; 11 pgs;The International Bureau of WIPO; Geneva, Switzerland.

Simovski, Constantin & He, Sailing; Frequency Range and Explicit Expressions for Negative Permittivity and Permeability for an Isotropic Medium Formed by a Lattice of Perfectly Conducting Ω Particles; Physics Letters A; 2003; pp. 254-263; Elsevier Science B.V.

Hao, Tong, Burd, Harvey J., Edwards, David J. & Stevens, Chris J.; Enhanced Detection of Buried Assets; Loughborough Antennas & Propagation Conference; Mar. 17-18, 2008; pp. 249-252; Loughborough, UK.

* cited by examiner

FIG. 1

| Resonators | | Resonant frequency (MHz) | Mean RCS (x10⁻³m²) |
|---|---|---|---|
| Dipole Omega |  | 910.5 | 9.51 |
| Dipole Omega SRR |  | 880.9 | 8.71 |
| Bowtie Omega |  | 645.9 | 7.89 |
| Bowtie Omega SRR |  | 636.4 | 7.67 |

RESONANT REFLECTOR ASSEMBLY AND METHOD

FIELD OF THE INVENTION

The present invention relates to resonant radar reflectors and to a method of using resonant radar reflectors. In particular but not exclusively the invention relates to identification of an asset using radar reflectors.

BACKGROUND

Determining a location and identity of a buried asset can be a challenging task. In some cases, determination of the location is performed by systematically digging holes in ground until the asset is found. In some cases, ground penetrating radar (GPR) is used, assets being identified by a signal reflected by the asset. (Reference to GPR includes radiation having a frequency in the range of from around 200 MHz to around 1 GHz. Other frequencies are also useful).

This technique for locating buries assets suffers the disadvantage that radiation can be reflected by a number of features of a volume of ground, including variations in moisture content, solids composition, the presence of wildlife, and voids formed for example by tunnelling wildlife. Thus it can be difficult to reliably identify a location of a buried asset.

Acoustic techniques have also been used to identify buried assets and found to suffer similar disadvantages to GPR techniques.

It is also known to attach a radio frequency identification tag (RFID tag) to a non-buried asset such as items for sale in a store in order to enable identification of the asset using a suitable RFID tag reader. Typically, an RFID tag is placed in an inductive RF magnetic field to induce a flow of electrical current in the tag. The flow of current is used to generate an RF transmission by the tag to the reader.

Inductive magnetic fields are relatively short range, however, and the use of such RFID tag systems to locate and identify assets more than a few meters from the reader is generally not practical.

In the case of buried assets the problem is exacerbated since inductive RF magnetic fields are more strongly attenuated by soils than by air.

More recently, far-field RFID technology has been developed. However, RFID readers are incapable of generating sufficiently large excitation signals to detect RFID tags at required distances below a surface.

U.S. Pat. No. 3,769,623 discloses a dichroic plate for passing radiation within a particular frequency band and reflecting radiation outside of that frequency band. The dichroic plate has slots provided therein dimensioned to pass radiation of a selected frequency.

U.S. Pat. No. 5,837,926 discloses mines having tuned passive electromagnetic reflectors to enhance radar detection.

SUMMARY OF THE INVENTION

In a first aspect of the invention there is provided a resonant radar reflector assembly comprising first and second reflector members, the first and second reflector members each being configured to resonate at a respective resonant frequency when irradiated by radio frequency (RF) radiation of a corresponding frequency,
  wherein the first member has a portion responsive to an electric field applied parallel to an electric polarisation axis of the first member, the second member having a corresponding portion responsive to an electric field applied parallel to a corresponding electric polarisation axis of the second member,
  the first member also having a portion responsive to a magnetic field applied parallel to a magnetic polarisation axis of the first member, the second member having a corresponding portion responsive to a magnetic field applied parallel to a corresponding magnetic polarisation axis of the second member,
the first and second members being arranged such that at least one electric or magnetic polarisation axis of the first member is substantially not parallel to the corresponding electric or magnetic polarisation axis of the second member.

Some embodiments of the invention have the advantage that passive identification tags may be provided that can be interrogated from a longer distance than RFID tags relying on interrogation by means of RF inductive fields. Embodiments of the invention may be interrogated by a far-field RF signal, such as is used in radar systems.

Because corresponding electric polarisation axes are substantially non-parallel or corresponding magnetic polarisation axes are substantially non-parallel a visibility of the assembly to polarised RF radiation such as ground-penetrating radar (GPR) may be enhanced. This is because in the case of a planar assembly (i.e. first and second reflector members are substantially coplanar) irradiated by a beam of GPR radiation normal to the plane of the reflector members and parallel to a magnetic polarisation axis of both members, if (say) the electric polarisation axis of the GPR signal is normal to the corresponding electric polarisation axis of one reflector member, the electric polarisation axis of the other reflector member of the assembly will have a component non-parallel to a corresponding electric polarisation axis of the GPR signal. Consequently this other reflector member is likely to reflect at least a portion of the GPR signal, enhancing visibility of the assembly.

The electric or magnetic polarisation axis of the first member may be substantially orthogonal to the corresponding electric or magnetic polarisation axis of the second member.

Thus, for example in some embodiments the corresponding electric polarisation axes may be orthogonal to one another and the corresponding magnetic polarisation axes may be parallel to one another or non-parallel to one another.

A reflector member of an assembly may have more than one axis of electric polarisation and/or more than one axis of magnetic polarisation.

A resonant frequency of the first member may be different to a resonant frequency of the second member, the members being arranged to reflect RF signals of different respective prescribed frequencies.

This feature has the advantage that RF signals of a plurality of different wavelengths may be reflected by a single assembly, allowing an assembly to be identified by measuring a difference between the resonant frequencies of the two members. This is in contrast to some embodiments in which both reflector members have the same resonant frequency. In this case, in some embodiments where a further reflector assembly having a reflector member having a different resonant frequency is not present, identification of the reflector assembly may be performed by measurement of the absolute resonant frequency of reflector members of the assembly, or by measurement of the difference between the resonant frequencies of the reflector members of the assembly and that of a reference resonant frequency. In some embodiments this requires interrogation apparatus calibrated to measure absolute values of a reflected signal detected by the interrogation apparatus.

The feature that two reflector members have different respective resonant frequencies has the further advantage that an identity of a reflector assembly can be determined by reference to the specific frequencies of RF radiation reflected by the assembly, allowing a larger number of assembly identifiers to be developed. For example, one assembly may be arranged whereby both members resonate at a frequency f1, another assembly may be configured whereby both members resonate at a different frequency f2, a further assembly being configured whereby one member resonates at the frequency f1 and another member resonates at the frequency f2.

It will be appreciated that a given assembly may have more than two reflector members and therefore in some such embodiments may have members having three or more members having different respective resonant frequencies.

A resonant frequency of each of the first and second reflector members may be substantially the same as one another whereby the members are arranged to reflect RF signals of substantially the same prescribed frequency.

Preferably the portion of at least one of the first or second members responsive to an electric field comprises a dipole portion.

This feature has the advantage that a resonant member of increased radar cross-section (RCS) may be provided.

The dipole portion may comprise a conducting portion having one selected from amongst a substantially straight linear portion, a substantially curved portion, a portion in the form of a meander pattern and a substantially tapered portion.

Preferably the portion of at least one of the reflector members responsive to a magnetic field applied parallel to a magnetic polarisation axis of the member comprises a loop portion.

Preferably the loop portion is a discontinuous loop such that the loop does not define a substantially closed path.

Preferably at least one reflector member comprises a loop portion and a dipole portion.

Preferably the first and second reflector members each comprise a loop portion and a dipole portion.

Preferably at least one reflector member having a dipole portion and a loop portion has a pair of dipole portions, the dipole portions being coupled to respective opposed ends of the loop portion.

Preferably each reflector member comprises a capacitive portion.

Preferably the capacitive portion comprises a pair of substantially parallel conducting elements.

Preferably the loop portion is coupled to the dipole portion by means of the capacitive portion. The elements of the capacitive portion may be oriented generally normal to the dipole portion.

Preferably the reflector members are arranged in use to be spaced apart from a conducting surface.

This feature has the advantage that the conducting surface may provide a 'pick-up' whereby an intensity of a signal reflected by the member is increased.

Preferably the reflector members of the assembly are arranged to be provided in a substantially coplanar configuration. The members may be arranged to be provided in an orientation substantially parallel to a plane of the conducting surface.

Preferably the reflector members are arranged to be spaced apart from the conducting surface by means of a dielectric medium.

The dielectric medium may be provided in the form of a layer of material to which the reflector members are attached.

The assembly may comprise the conducting surface.

Alternatively or in addition the conducting surface may be provided by an asset associated with the assembly.

The assembly may be arranged to be coupled to the asset.

Preferably the portions of the first and second members responsive to an electric field and the portions of the first and second members responsive to a magnetic field comprise electrically conducting portions, Preferably the portions of the first and second members responsive to an electric field and the portions of the first and second members responsive to a magnetic field comprise substantially flat electrically conducting tracks formed on a substrate, Preferably said portions of the first and second members are formed on a common substrate.

Alternatively said portions of the first and second members may be formed on different respective substrates.

In a second aspect of the invention there is provided a structure comprising first and second strings of resonant radar reflector members, the first string having the form of a right-handed helix, the second string having the form of a left-handed helix, the first and second strings intersecting one another at at least one intersect position of the structure, the structure providing a reflector assembly according to the first aspect of the invention at one of said at least one intersect positions.

Thus a reflector member of the first string and a reflector member of the second string located proximate an intersection of the first string with the second string may be arranged to have corresponding axes of electric polarisation or corresponding axes of magnetic polarisation that are generally non-parallel to one another.

This feature has the advantage that an assembly may be formed in a convenient manner during a process of fabricating the asset and/or applying reflector members to the asset. Other ways of forming assemblies of reflector members may be useful.

Such a structure may be formed around an asset such as a pipe or any other suitable asset. The structure may be supported by the asset. For example, reflector members of the structure may be coupled to the asset individually, for example by an adhesive. Alternatively reflector members of the assembly may be coupled to one another, for example by means of a carrier material such as a tape to which the reflector members are attached.

A reflector member of the first string and a reflector member of the second string located proximate an intersection of the first string with the second string may have corresponding axes of electric polarisation or corresponding axes of magnetic polarisation that are substantially perpendicular to one another.

This feature has the advantage that detection of reflector members at the intersection may be made substantially independent of a plane of polarisation of electromagnetic radiation used to interrogate a reflector assembly, such as GPR or any other useful form of electromagnetic radiation.

Preferably reflector members of a given string have corresponding axes of electric polarisation or corresponding axes of magnetic polarisation that have a generally fixed angle with respect to a longitudinal axis of the structure, the reflector members being arranged at different respective angular positions about the longitudinal axis.

Preferably a resonant frequency of a reflector member of the first string may be different from a resonant frequency of a reflector member of the second string.

This feature has the advantage that in some embodiments information concerning a relative orientation of an assembly, and therefore the asset to which the assembly is attached, may be obtained more readily by interrogation apparatus.

In some embodiments of the invention interrogation apparatus is provided and arranged to vary an orientation of a plane of polarisation of a beam of plane-polarised interrogating radiation and to determine an orientation of the assembly by measuring an intensity of a signal reflected by one or more reflector assemblies as a function of orientation of the plane of polarisation.

Preferably the first string comprises a plurality of reflector members each having a resonant frequency of a first value and the second string comprises a plurality of reflector members each having a resonant frequency of a second value different from the first value.

The reflector members may be arranged in a spatial configuration whereby an identifier of an asset associated with the structure may be determined based on said spatial configuration.

A first reflector assembly of the structure may comprise a reflector member having a resonant frequency different from a resonant frequency of a reflector member of a second reflector assembly of the structure thereby to provide at least a portion of an identifier of an asset.

Alternatively or in addition a distance between respective reflector assemblies of the structure may be configured to provide at least a portion of an identifier of the asset.

In some embodiments interrogation apparatus is arranged to irradiate the assembly with circularly polarised radiation. In some embodiments interrogation apparatus is arranged to irradiate the assembly with unpolarised radiation.

In a third aspect of the invention there is provided an asset having an assembly according to the first aspect of the invention provided thereon.

In a fourth aspect of the invention there is provided an asset comprising a structure according to the second aspect of the invention.

In a fifth aspect of the invention there is provided an asset according to the third or fourth aspects of the invention comprising a pipe.

The asset may be buried underground.

In a sixth aspect of the invention there is provided a vehicle having an assembly according to the first aspect provided thereon.

In a seventh aspect of the invention there are provided first and second strings of resonant radar reflector members, the first string having the form of a right-handed helix, the second string having the form of a left-handed helix, the first and second strings being arranged to intersect one another at at least one intersect position, the strings providing a reflector assembly according to the first aspect of the invention at the at least one intersect position.

In an eighth aspect of the invention there is provided a method of identifying an article comprising the steps of:
providing a resonant radar reflector assembly comprising first and second reflector members, the first and second reflector members each being configured to resonate at their respective resonant frequency when irradiated by radio frequency (RF) radiation of a corresponding frequency,
wherein the first member has a portion responsive to an electric field applied parallel to an electric polarisation axis of the first member, the second member having a corresponding portion responsive to an electric field applied parallel to a corresponding electric polarisation axis of the second member,
the first member also having a portion responsive to a magnetic field applied parallel to a magnetic polarisation axis of the first member, the second member having a corresponding portion responsive to a magnetic field applied parallel to a corresponding magnetic polarisation axis of the second member,
the first and second members being arranged such that at least one electric or magnetic polarisation axis of the first member is substantially not parallel to the corresponding electric or magnetic polarisation axis of the second member;
irradiating the assembly with RF radiation including radiation of a frequency corresponding to the resonant frequency of at least one of the first and second reflector members; and
detecting radiation reflected by the assembly.

A resonant frequency of the first reflector member may be different from a resonant frequency of the second reflector member, the method further comprising measuring the resonant frequency of the first and second reflector members.

Alternatively or in addition, a resonant frequency of the first reflector member is different from a resonant frequency of the second reflector member and the method further comprises measuring a difference between the resonant frequency of the first reflector member and the resonant frequency of the second reflector member.

The step of irradiating the assembly with RF radiation may comprise irradiating the assembly with plane polarised RF radiation.

The method may comprise the step of determining an orientation of a reflector member by changing a plane of polarisation of the plane polarised RF radiation and detecting a signal reflected by said reflector member.

Alternatively or in addition the method may comprise the step of irradiating the assembly with at least one selected from amongst circularly polarised RF radiation and unpolarised RF radiation.

In some embodiments identification of an assembly and/or an asset is determined by reference to relative or absolute intensities of signals reflected from one or more reflector members.

In a ninth aspect of the invention there is provided a method of identifying an article comprising the steps of:
providing a resonant radar reflector assembly comprising first and second reflector members, the first and second reflector members being configured to resonate at a resonant frequency when irradiated by radio frequency (RF) radiation of a corresponding frequency, the first and second reflector members each having a dipole portion, at least one of the members further having a loop portion, each member having a polarisation axis, the members being arranged whereby the polarisation axis of the first member is substantially not parallel to the polarisation axis of the second member;
irradiating the assembly with RF radiation including radiation of a frequency corresponding to the resonant frequency of at least one of the first and second reflector members; and
detecting radiation reflected by the assembly

BRIEF DESCRIPTION OF THE DRAWINGS

Embodiments of the invention will now be described with reference to the accompanying drawings in which.

FIGS. 4 (a) and (b) show a pipe having a plurality of reflector assemblies provided thereon;

DETAILED DESCRIPTION

Figure 1:
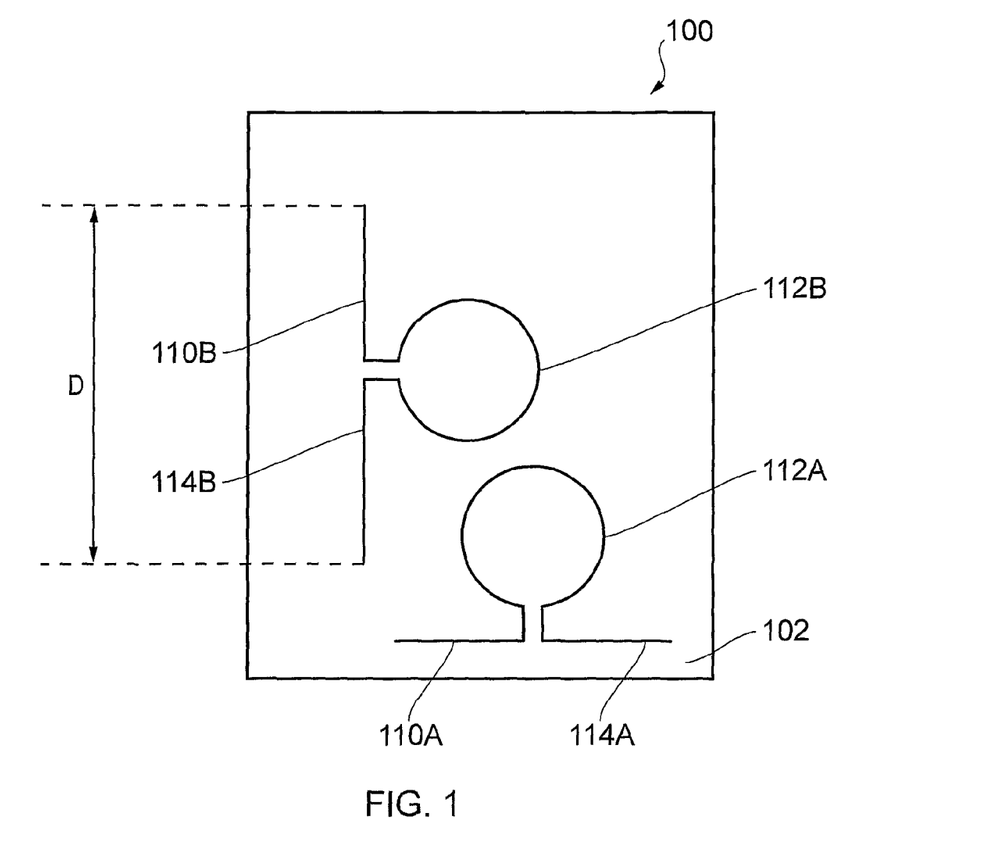
FIG. 1 shows a resonant radar reflector assembly according to an embodiment of the invention.

In some embodiments of the invention a resonant radar reflector assembly 100 is provided as shown in FIG. 1. The assembly has a pair of resonant radar reflector members 110A, 110B provided on a substrate 102. In some embodiments of the invention the reflector members 110A, 110B are arranged to reflect radiation in the GPR frequency range, i.e. frequencies less than around 1 GHz. Other frequency ranges are also useful.

Soil in urban areas is a relatively complex environment for electromagnetic propagation. Soil typically has inhomogeneous propagation constants, but can be theoretically approximated as a conducting dielectric medium. Depending on the particular soil composition, it may have a large range of dielectric constants and conductivities. These parameters influence the attenuation of radiation propagating therein and the electromagnetic resonance characteristics of devices and structures immersed in the medium.

For certain subterranean applications a good resonator should ideally have good radiation efficiency, high Q factor, and an identifiable reflection resonance that is relatively insensitive to soil condition, particularly to water content of the soil.

In the embodiment of FIG. 1 the reflector members 110A, 110B are arranged generally at right angles to one another. Other configurations are also useful.

The reflector members 110A, 110B each comprise a loop portion 112A, 112B and a dipole portion 114A, 114B. The reflector members 110A, 110B are arranged to resonate at a resonant frequency in response to incident RF radiation of a prescribed frequency. This resonant frequency is determined at least in part by dimensions of the reflector members 110A, 110B. The dimensions of interest include the diameter of the loop portion 112A, 112B and the length of the dipole portion 114A, 114B.

Each of the reflector members 110A, 110B has an axis of electric polarisation generally parallel to a longitudinal axis of the dipole portion 114A, 114B. It is to be understood that polarised electromagnetic radiation having an electric field component polarised generally normal to the electric polarisation axis of one of the reflector members 110A, 110B will generally not cause that reflector member to resonate at an amplitude that is as great as that when the electric field component is polarised generally parallel to the axis of electric polarisation of that reflector member.

In particular, in the case of irradiation of a reflector member with radiation having an electric polarisation axis normal to the electric polarisation axis of the reflector member it is possible that an amount of reflected radiation (if any) will be insufficient to allow a reflector member buried underground to be detected by an RF detector co-located with a source of radiation distal the reflector member (e.g. at the surface of the ground).

Similarly, each of the reflector members 110A, 110B has an axis of magnetic polarisation generally normal to a plane of the respective loop portion 112A, 112B. It is to be understood that polarised electromagnetic radiation having a magnetic field component polarised generally normal to the axis of magnetic polarisation of one of the reflector members 110A, 110B will generally not cause that reflector member to resonate at an amplitude that is as great as that when the magnetic field component is polarised generally parallel to the axis of magnetic polarisation of the reflector member.

In some embodiments of the invention, reflector members of different shapes to those of the embodiment of FIG. 1 are used. FIG. 2 shows examples of reflector members according to some embodiments of the invention together with a corresponding resonant frequency. Values of mean radar cross-section (RCS) of the reflector members are also listed. It is to be understood that other resonant frequencies are also useful. The resonant frequencies of the types of structures shown in FIG. 2 are presented merely as examples of possible frequencies. Similar structures having different resonant frequencies and different values of RCS are also useful.

Figure 2A:
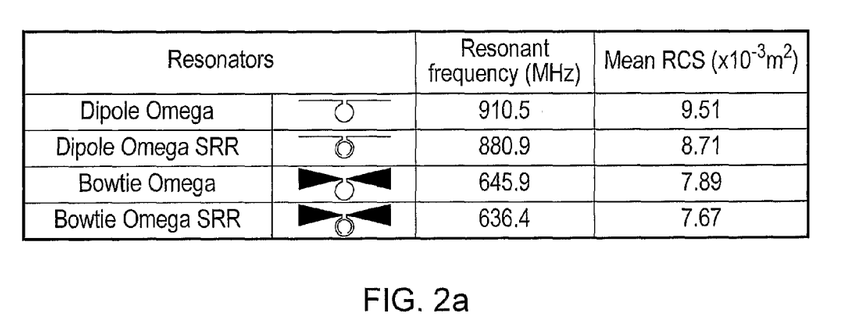
FIG. 2 shows a variety of designs of reflector member according to some embodiments of the invention.
Figure 2B:
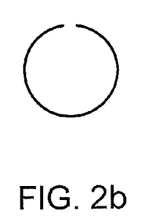
Figure 2C:
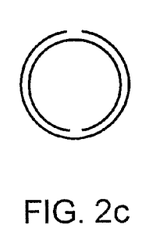
Figure 2D:
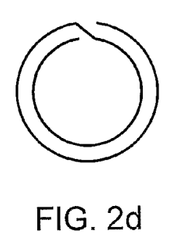
Figure 2E:
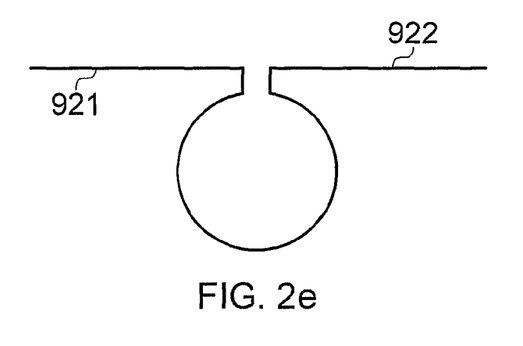
Figure 2F:
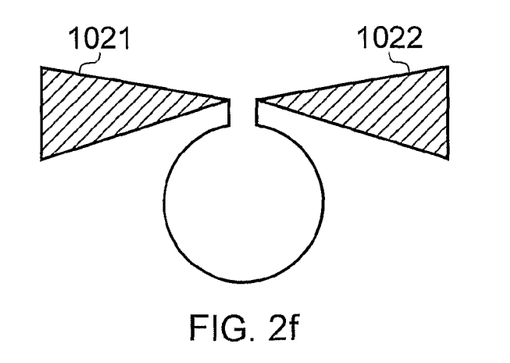

The dipole omega resonator structure of FIG. 2(a) is also shown in FIG. 2(e), whilst the bowtie omega of FIG. 2(a) is also shown in FIG. 2(f).

A split ring resonator (SRR) is shown in FIG. 2(c) and forms the loop portion of the dipole omega SRR and bowtie omega SRR structures of FIG. 2(a).

A resonator having a spiral ring resonator portion (FIG. 2(d)) may be used instead of the ring resonators of FIG. 2(b), (c).

A simple empirical formula indicates that by adjusting the length D of the dipole omega structure of FIG. 1, the resonant frequency f of the structure can be adjusted:

$$f = kc/(2D\in_r^{1/2})$$

where k is the tuning coefficient, c is the speed of light in vacuum, D is the overall length of the structure, and $\in_r$ is the dielectric constant of the soil.

As described above, the reflector assembly 100 of FIG. 1 is provided with a pair of reflector members 110A, 110B arranged such that their respective axes of electric polarisation are generally orthogonal to one another.

By way of example consider radiation propagating in a direction generally normal to a plane of the assembly 100 of FIG. 1. If an axis of electric polarisation of the radiation is normal to an electric polarisation axis of (say) reflector 110A, the axis of electric polarisation of reflector 110B will be parallel to the axis of electric polarisation of the radiation. Thus, reflector 110B would be expected to reflect radiation more strongly than reflector 110A. In some cases it might be that reflector 110A would reflect substantially no radiation under the conditions described above.

It will be understood that the provision of two generally non-parallel reflector members allows in some cases the detection of reflector assemblies using RF radiation having a single plane of polarisation.

In some embodiments of the invention the reflector members of a reflector assembly are arranged to resonate at substantially the same resonant frequency. In some embodiments the reflector members of a given assembly are arranged to resonate at different respective frequencies.

Figure 3:
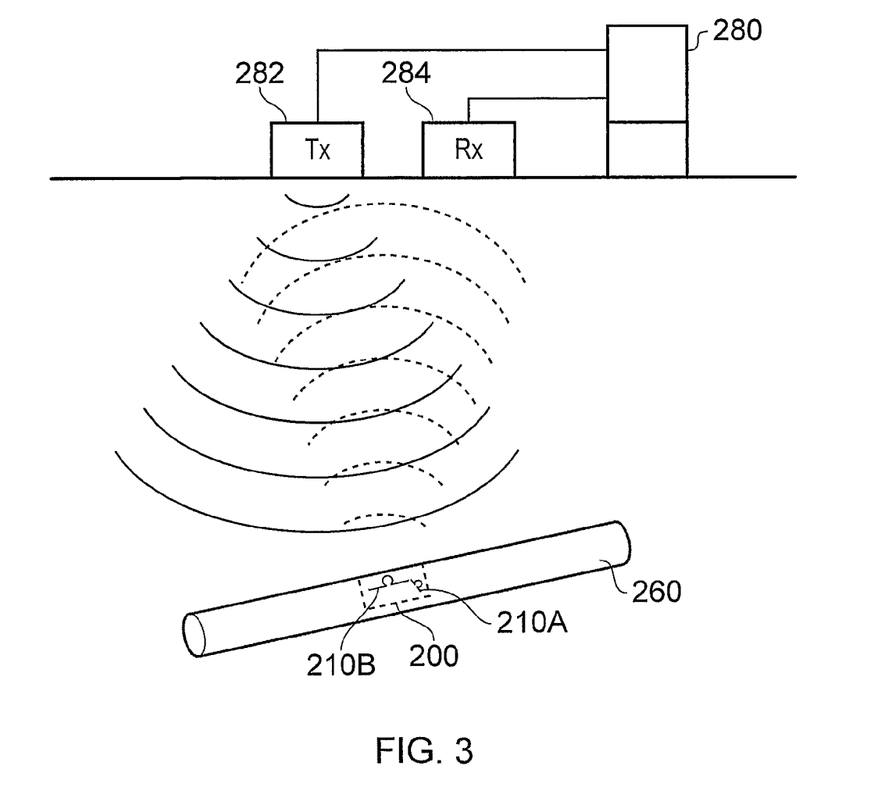
FIG. 3 shows a pipe having a resonant radar reflector assembly according to an embodiment of the invention provided thereon.

FIG. 3 shows a scenario in which an underground asset (a utility pipe 260) has been provided with a reflector assembly 200 according to an embodiment of the invention. Interrogation apparatus 280 having a transmitter element 282 and a receiver element 284 has been arranged to transmit an RF signal in the direction of the pipe 260 and to detect a signal reflected by the reflector assembly 200.

The reflector assembly 200 is provided with a pair of reflector members 210A, 210B having different respective resonant frequencies. The interrogation apparatus 280 is arranged to irradiate the reflector assembly with RF radiation of a frequency corresponding to the resonant frequencies of each of the reflector members 210A, 210B in turn.

In some embodiments, an RF signal launched by the transmitter element 282 is arranged to vary in frequency as a function of time in steps of a given frequency.

Following a step change in transmission frequency, the interrogation apparatus measures a time taken for a signal of a frequency corresponding to the transmission frequency to be detected by the receiver element 284 as a signal reflected by a reflector member 284.

In some embodiments of the invention the provision of a pair of reflector members 110A, 110B assists a process of identifying the reflector assembly 200 since the difference between the resonant frequencies of the reflector members, rather than the absolute frequencies themselves, can be measured. Thus, precise calibration of the interrogation apparatus 280 in order to measure absolute frequencies is not required.

In circumstances in which it is required to identify articles by means of a 'fingerprint' unique to the article or a class of articles, reflector assemblies may be arranged in a spatial configuration unique to that article or class of articles. Different respective spatial configurations may differ in one or more parameters such as a distance between respective assembles of a given configuration, a distance between reflector members of a given assembly and/or the one or more frequencies of RF radiation that a given assembly is arranged to reflect.

In some embodiments reflector members of a given assembly are not physically coupled or attached to one another, but are separate reflector members that are attached to an asset or positioned close to an asset without being attached to the asset.

Figure 4A:
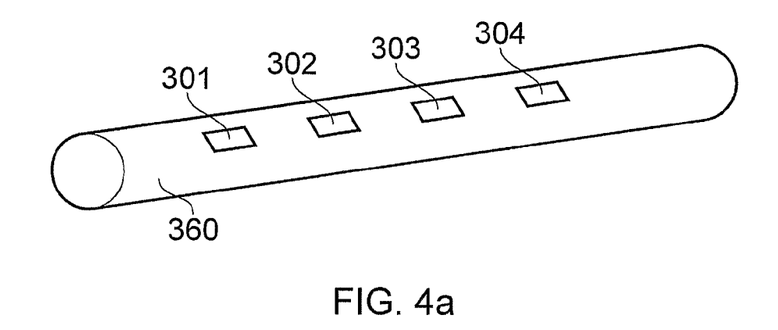

By way of example, FIG. 4(a) shows a pipe having four reflector assemblies 301, 302, 303, 304 provided thereon. In some embodiments the reflector assemblies are substantially equally spaced apart along the pipe. In some embodiments the reflector assemblies are not substantially equally spaced apart along the pipe.

In the embodiment of FIG. 4(a) the assemblies are arranged in a configuration whereby a resonant frequency of at least one of the assemblies is different from a resonant frequency of at least one other of the assemblies. For example, the resonant frequency of elements 301, 303 and 304 may be of a first value whilst the resonant frequency of element 302 may be of a second value different from the first value. Configurations in which three or more assemblies are provided each having a different respective resonant frequency are also useful. The assemblies may be arranged whereby a particular combination of resonant frequency and location of respective assemblies provides an identifier of the asset.

Figure 4B:
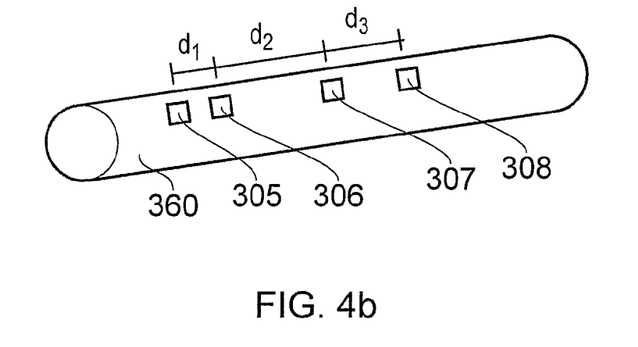

In the embodiment of FIG. 4(b) the assemblies are arranged in a combination whereby a spatial separation of adjacent assemblies along the length of the pipe is characteristic of the pipe, providing an identifier of the pipe. Thus, a spatial separation of adjacent assemblies 305, 306 is a distance d1, a separation of adjacent assemblies 306, 307 is a distance d2 and a separation of adjacent assemblies 307, 308 is a distance d3, the combination of respective values of d1, d2 and d3 providing the unique identifier.

In some embodiments, an identifier of a pipe is provided by a combination of a value of a resonant frequency of an assembly and a value of a distance between one or more pairs of assemblies.

In some embodiments, an identifier of a pipe is provided by the number of assemblies of a given group of assemblies. For example, in some embodiments respective groups of assemblies are separated by a prescribed distance whereby a number of assemblies of a given group may be determined, such as two, three, four, five or more assemblies of as given group.

In some embodiments members of a given group of assemblies each have substantially the same resonant frequency or pair of resonant frequencies.

In some embodiments such as embodiments in which a group of assemblies are provided in a generally linear configuration, assemblies at ends of the linear configuration may be arranged to reflect radiation of one or more prescribed frequencies to aid identification of a given group.

Figure 5:
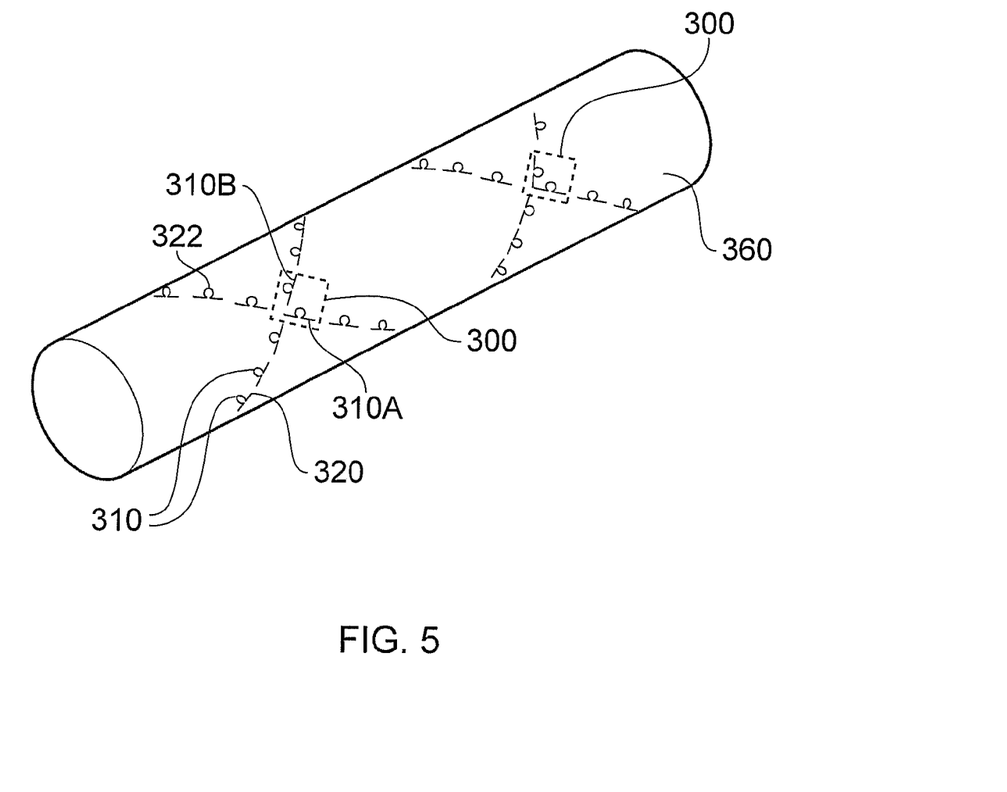
FIG. 5 shows a pipe having two helical strings of reflector members provided thereon.

FIG. 5 shows a further embodiment of the invention in which a pipe 360 has been provided with two strings of reflector members 320, 322 in a substantially helical arrangement around the pipe 360. The two strings are of left-handed and right-handed orientation, respectively.

Mutually adjacent reflector members 310 within a given string are arranged to have their axes of polarisation generally mutually co-linear with one another along a helical path.

It will be appreciated that in the embodiment shown in FIG. 5, a reflector assembly 300 is provided at an intersection of the respective strings of reflector members, an assembly being provided by reflector members 310A and 310B of respective different strings.

It will be appreciated that helical wrapping of reflector members according to some embodiments of the invention around an asset such as a pipe in the manner indicated generally in FIG. 5 is useful in providing means for identifying an asset. Such wrapping provides identification from which a useful reflected signal may be obtained by interrogation apparatus substantially independently of a direction of polarisation of RF radiation generated by the interrogation apparatus. This is at least in part because the reflector members are arranged to have a plurality of respective different orientations.

In some embodiments such as that of FIG. 5 in which reflector members are provided with axes of polarisation that are generally co-linear, coupling between adjacent reflector members can enhance a magnitude of a signal reflected by a given reflector member.

In some embodiments the strings of reflector members are introduced to the pipe during a process of forming the pipe, for example following or during a process of extrusion of the pipe.

Figure 6:
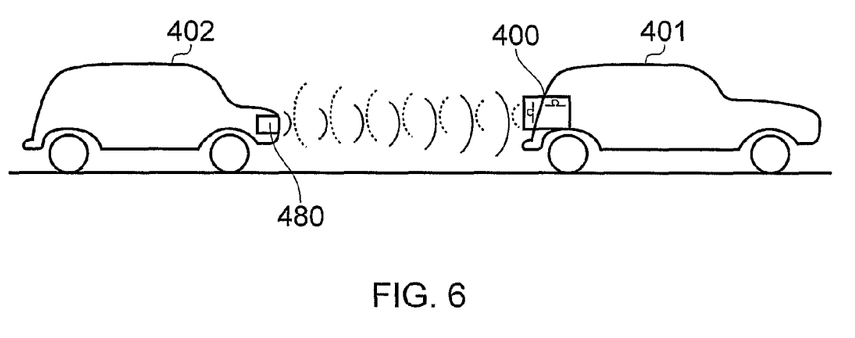
FIG. 6 shows a road safety system having a resonant radar reflector assembly according to an embodiment of the invention.

FIG. 6 shows an embodiment of the invention in which a motor vehicle 401 has been fitted with a reflector assembly 400 according to an embodiment of the invention. A further vehicle 402 has been fitted with interrogation apparatus 480 according to an embodiment of the invention, the interrogation apparatus 480 being arranged to detect a reflector assembly 400 of the kind fitted to vehicle 401.

Detection of the assembly 400 by interrogation apparatus 480 can be used to trigger an alert to a driver of vehicle 402. In some embodiments a controller in vehicle 402 is configured to measure a relative speed of vehicles 401, 402 and to provide an alert in the event that the relative speed exceeds a prescribed value. In some embodiments a rate of change of relative speed is used to trigger an alert. Other means for triggering an alert are also useful.

In some embodiments interrogation apparatus 480 is arranged to distinguish between reflector assemblies arranged to reflect different frequencies or combinations of frequencies of RF radiation. Thus, in some embodiments reflector assemblies are provided whereby a driver of a vehicle can distinguish between motor vehicles and pedal cycles.

It is to be understood that some embodiments of the invention are not limited to the identification of vehicles but are useful in distinguishing identities of personnel, wildlife, aircraft, watercraft, geographical locations (for example by incorporation of a reflector assembly into a surveyor's plaque).

It is to be understood that in some embodiments reflector assemblies are provided each having a pair of reflector members, such that reflector members having N different frequencies are provided. A frequency code with the potential to provide $2^{N-1}$ uniquely identified codes may therefore be provided. It will be appreciated that respective reflector members of a given assembly according to such embodiments may have the same or different resonant frequencies Embodiments of the invention are useful in labelling of archaeological artefacts, geographical locations such as a site of an excavation, buried toxic waste sites, buried property line boundaries, survey benchmarks such as Ordnance Survey marks, building standards concrete coding, and a number of other applications.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A resonant radar reflector assembly comprising first and second reflector members, the first and second reflector members each being configured to resonate at a respective resonant frequency when irradiated by radio frequency (RF) radiation of a corresponding frequency,
   wherein the first member has a portion responsive to an electric field applied parallel to an electric polarisation axis of the first member, the second member having a corresponding portion responsive to an electric field applied parallel to a corresponding electric polarisation axis of the second member,
   the first member also having a portion responsive to a magnetic field applied parallel to a magnetic polarisation axis of the first member, the second member having a corresponding portion responsive to a magnetic field applied parallel to a corresponding magnetic polarisation axis of the second member,
   the first and second members being arranged such that at least one electric or magnetic polarisation axis of the first member is substantially not parallel to the corresponding electric or magnetic polarisation axis of the second member; and
   wherein a resonant frequency of the first member is different to a resonant frequency of the second member, the members being arranged to reflect electromagnetic radiation of different respective prescribed frequencies.

2. An assembly as claimed in claim 1 wherein the electric or magnetic polarisation axis of the first member is substantially orthogonal to the corresponding electric or magnetic polarisation axis of the second member.

3. An assembly as claimed in claim 1 wherein the portion of at least one of the first or second members responsive to an electric field comprises a dipole portion.

4. An assembly as claimed in claim 1 wherein the portion of at least one of the reflector members responsive to a magnetic field applied parallel to a magnetic polarisation axis of the member comprises a conducting portion having a loop portion.

5. An assembly as claimed in claim 4 wherein the loop portion is a discontinuous loop such that the loop does not define a substantially closed conducting path.

6. An assembly as claimed in claim 1 further comprising at least one reflector member having a pair of dipole portions and a loop portion, the dipole portions being electrically coupled to respective opposed ends of the loop portion whereby a substantially continuous conducting path is provided through the loop portion between respective dipole portions.

7. An assembly as claimed in claim 6 wherein each reflector member comprises a capacitive portion.

8. An assembly as claimed in claim 7 wherein the loop portion is coupled to the dipole portions by means of the capacitive portion.

9. An assembly as claimed in claim 1 wherein the reflector members are arranged in use to be spaced apart from a conducting surface.

10. An assembly as claimed in claim 9 wherein the conducting surface is provided by an asset associated with the assembly.

11. An assembly as claimed in claim 1 wherein the portions of the first and second members responsive to an electric field and the portions of the first and second members responsive to a magnetic field comprise substantially flat electrically conducting tracks formed on a substrate.

12. An assembly as claimed in claim 1 further comprising a structure, the structure comprising first and second strings of resonant radar reflector members, the first string having the form of a right-handed helix, the second string having the form of a left-handed helix, the first and second strings intersecting one another at least one intersect position of the structure, the structure providing the reflector assembly at one of said at least one intersect positions.

13. An assembly as claimed in claim 12 wherein the first string comprises a plurality of reflector members each having a resonant frequency of a first value and the second string comprises a plurality of reflector members each having a resonant frequency of a second value different from the first value.

14. An assembly as claimed in claim 1 further comprising a structure, the structure comprising a plurality of the reflector assemblies wherein the reflector members are arranged in a spatial configuration whereby an identifier of an asset associated with the structure may be determined based on said spatial configuration.

15. An assembly as claimed in claim 14 wherein a first reflector assembly of the structure comprises a reflector member having a resonant frequency different from a resonant frequency of a reflector member of a second reflector assembly of the structure thereby to provide at least a portion of an identifier of an asset.

16. An assembly as claimed in claim 14 wherein a distance between respective reflector assemblies of the structure is configured to provide at least a portion of an identifier of the asset.

17. A method of identifying an article comprising the steps of:
  providing a resonant radar reflector assembly comprising first and second reflector members, the first and second reflector members each being configured to resonate at their respective resonant frequency when irradiated by radio frequency (RF) radiation of a corresponding frequency,
  wherein the first member has a portion responsive to an electric field applied parallel to an electric polarisation axis of the first member, the second member having a corresponding portion responsive to an electric field applied parallel to a corresponding polarisation axis of the second member,
  the first member also having a portion responsive to a magnetic field applied parallel to a magnetic polarisation axis of the first member, the second member having a corresponding portion responsive to a magnetic field applied parallel to a corresponding magnetic polarisation axis of the second member,
  wherein a resonant frequency of the first reflector member is different from a resonant frequency of the second reflector member;
  the first and second members being arranged such that at least one electric or magnetic polarisation axis of the first member is substantially not parallel to the corresponding electric or magnetic polarisation axis of the second member;
  irradiating the assembly with RF radiation including radiation of a frequency corresponding to the resonant frequency of the first and second reflector members;
  detecting radiation reflected by the assembly; and
  measuring the resonant frequency of the first and second reflector members.

18. A method as claimed in claim 17 further comprising measuring a difference between the resonant frequency of the first reflector member and the resonant frequency of the second reflector member.

19. A method as claimed in claim 17 further comprising the step of determining an orientation of a reflector member by changing a plane of polarisation of the plane polarised RF radiation and detecting a signal reflected by said reflector member.

20. A method of identifying an article comprising the steps of:
  providing a resonant radar reflector assembly comprising first and second reflector members, the first and second reflector members being configured to resonate at a resonant frequency when irradiated by radio frequency (RF) radiation of a corresponding frequency, the first and second reflector members each having a dipole portion, at least one of the members further having a loop portion, each member having a polarisation axis, the members being arranged whereby the polarisation axis of the first member is substantially not parallel to the polarisation axis of the second member;
  wherein a resonant frequency of the first reflector member is different from a resonant frequency of the second reflector member; and
  irradiating the assembly with RF radiation including radiation of a frequency corresponding to the resonant frequency of at least one of the first and second reflector members; and detecting radiation reflected by the assembly.

* * * * *